United States Patent [19]
Rosa et al.

[11] Patent Number: 4,656,713
[45] Date of Patent: * Apr. 14, 1987

[54] METHOD FOR FORMING AN AIR GAP PIPE

[75] Inventors: Bruno A. Rosa; Jon W. Harwood; Walter G. Moring, III, all of Toledo, Ohio; Peter L. Resuggan, Goldsboro, N.C.

[73] Assignee: AP Industries, Inc., Toledo, Ohio

[*] Notice: The portion of the term of this patent subsequent to Feb. 26, 2002 has been disclaimed.

[21] Appl. No.: 790,737

[22] Filed: Oct. 24, 1985

[51] Int. Cl.⁴ .................. B21D 53/00; B23P 15/26; F16L 9/18
[52] U.S. Cl. ................... 29/157 R; 29/416; 29/455 R; 29/463; 29/DIG. 13; 29/DIG. 48; 60/322; 138/113; 138/114; 138/148; 181/283; 219/121 LG; 219/121 LM; 228/141.1
[58] Field of Search .............. 29/157 R, 416, 455 R, 29/157 A, 157 T, 237, 282, 412, 463, DIG. 13, DIG. 48; 60/320, 321, 322; 138/111, 113, 114, 148, 178; 181/282, 283; 228/141.1, 170, 173.4; 219/121 EH, 121 EK, 121 EM, 121 LG, 121 LM, 121 LN, 121 PC, 121 PH

[56] References Cited

U.S. PATENT DOCUMENTS

| | | | |
|---|---|---|---|
| 236,077 | 12/1880 | Peirce | 138/114 X |
| 813,918 | 2/1906 | Schmitz | 138/114 X |
| 1,542,663 | 6/1925 | Brenzinger | 138/171 |
| 1,618,611 | 2/1927 | Trout | 29/455 R |
| 1,930,285 | 10/1933 | Robinson | 138/113 X |
| 2,259,433 | 10/1941 | Kitto | 138/113 X |
| 2,274,519 | 2/1942 | Barrett | 29/455 R |
| 2,305,397 | 12/1942 | Watter | 138/173 |
| 2,329,938 | 9/1943 | Ortiz | 228/170 |
| 2,370,062 | 3/1943 | Mercier | 60/320 |
| 2,756,032 | 7/1956 | Dowell | 138/151 |
| 2,959,196 | 11/1960 | Truesdell et al. | 138/148 X |
| 3,009,484 | 11/1961 | Dollens | 181/282 X |
| 3,104,732 | 9/1963 | Ludlow et al. | 29/157 R |
| 3,190,254 | 6/1965 | Meibauer | 60/320 X |
| 3,209,856 | 10/1965 | Saunders | 138/148 X |
| 3,219,142 | 11/1965 | Deremer | 29/157 R |
| 3,438,430 | 4/1969 | Kestemont | 138/113 X |
| 3,457,724 | 6/1969 | Gandy et al. | 60/320 X |
| 3,645,092 | 2/1972 | Tatsutomi et al. | 60/322 |
| 3,863,445 | 2/1975 | Heath | 60/320 X |
| 3,884,194 | 5/1975 | Grosseau | 60/320 X |
| 3,908,372 | 9/1975 | Fowler et al. | 60/320 |
| 4,031,699 | 6/1977 | Suga et al. | 60/322 X |
| 4,185,463 | 1/1980 | Tanahashi et al. | 60/322 |
| 4,501,302 | 2/1985 | Harwood | 138/113 |
| 4,590,652 | 5/1986 | Harwood | 29/157 R |

FOREIGN PATENT DOCUMENTS

| | | | |
|---|---|---|---|
| 2642995 | 3/1978 | Fed. Rep. of Germany | 60/320 |
| 25492 | 2/1979 | Japan | 219/121 LG |
| 14491 | 1/1982 | Japan | 219/121 LG |
| 193289 | 11/1982 | Japan | 219/121 LG |
| 119484 | 7/1983 | Japan | 219/121 LM |
| 632013 | 11/1949 | United Kingdom | 181/282 |

Primary Examiner—Howard N. Goldberg
Assistant Examiner—Ronald S. Wallace
Attorney, Agent, or Firm—Anthony J. Casella; Gerald E. Hespos

[57] ABSTRACT

A process and an apparatus for forming an air gap pipe are provided. Inner and outer pipes are bent or deformed into comparable configurations such that the inner pipe can be mounted within the outer pipe. The outer pipe then is split longitudinally by a preprogrammed cutting apparatus. The cutting of the outer pipe terminates just short of the complete longitudinal length of the pipe to facilitate rematching later in the process. The cutter includes a follower to trace the actual configuration of the pipe and thereby to offset differences from one pipe to the next. An array of clamps are provided to align the outer pipe halves relative to one another and to facilitate the reattachment.

21 Claims, 14 Drawing Figures

METHOD FOR FORMING AN AIR GAP PIPE

RELATED PATENTS AND APPLICATIONS

This application is related to U.S. Pat. No. 4,501,302 which issued on Feb. 26, 1985. This application also is related to co-pending application Ser. No. 671,416, filed Nov. 14, 1984, now U.S. Pat. No. 4,590,652 which issued May 27, 1986, and to co-pending application Ser. No. 696,311 filed Jan. 30, 1985 now U.S. Pat. No. 4,619,292 which issued Oct. 28, 1986. The above identified patents and applications are assigned to the assignee of the subject application.

BACKGROUND OF THE INVENTION

The United States government has imposed emission standards on automobiles in an effort to control certain types of air pollutants. These emissions standards have become increasingly more stringent over the past several years, and are likely to continue to become increasingly stringent. Automobile manufacturers have employed various devices to catalytically convert certain exhaust gases into less noxious forms. Additionally, manufacturers have utilized devices to achieve more complete combustion of fuels. These latter devices have included valves which direct additional air into the engine and/or valves which recirculate some exhaust gases for further combustion.

It has been found that devices which effect more complete and efficient combustion also cause higher combustion temperatures and correspondingly hotter exhaust gases. These hotter exhaust gases have been difficult to safely accommodate. Specifically, the hot exhaust gases have substantially elevated the temperature of the exhaust pipe, the muffler, and the tailpipe. These temperatures have been high enough to damage adjacent parts of the vehicle.

Certain exhaust system accessories are known which help isolate portions of the exhaust system from adjacent parts of the vehicle. For example, heat shields which are stamp formed from sheet metal can be mounted between, but spaced from, the exhaust system component and an adjacent part of a vehicle. Heat shields typically are used to isolate a specific hot spot, such as a catalytic converter, from a particularly vulnerable part of the vehicle. Larger heat shields covering a long exhaust pipe or tailpipe have been too costly to make and too difficult to mount.

Other structures have been developed which utilize a thermal insulation. Although structures of this type are quite effective in isolating hot spots in an exhaust system, the insulation must be protected against environmental damage. This generally requires a structurally secure protective enclosure. The added costs of both the insulation and the enclosure make this otherwise effective option somewhat impractical. In practice, thermal insulation is generally used only in certain converters and mufflers. Thermal insulation has been considered too costly for most applications on elongated pipes extending throughout the exhaust system.

Air gap pipes provide an exceptional heat insulation for the exhaust pipes and tailpipes of an exhaust system. The air gap pipe includes an inner pipe through which the exhaust gases are carried and an outer pipe spaced therefrom. The air gap between the inner and outer pipes provides the desired insulation.

Until recently, the manufacture of air gap pipes has been slow and costly. More particularly, until recently, the prior art included two methods for making an air gap pipe that included discontinuities along the length. The first method involved the insertion of a smaller diameter linear pipe into a larger diameter linear pipe. A filler then was inserted between the two to centrally support the inner pipe within the outer pipe. The filler had generally comprised a metallic material having a significantly lower melting point than the metal from which the inner and outer pipes where formed. Thus, the supporting material was inserted into the space between the inner and outer pipes in a liquid form and subsequently was allowed to cool and solidify. With the inner pipe thus securely supported within the outer pipes substantially along its entire length, the combination could be bent or otherwise deformed into a configuration for use on the vehicle. This combination then would be heated sufficiently to melt the supporting filler material, and thereby enable the molten material to flow from the combined structure. An air gap thus remained between the inner and outer pipes. This procedure was extremely time consuming and costly. Furthermore, the few materials that could be used as a filler were extremely costly. Variations of this procedure involved the use of a sand or lead shot filler that could be flushed out after the pipes were bent.

The second prior art method for manufacturing an air gap pipe involved the use of a band saw to cut a previously deformed outer pipe in half along its length. The two halves then were separated and supports were welded to the inner surfaces of the outer pipe halves. A similarly deformed inner pipe would then be positioned between the outer pipe halves. Once again, this was an extremly slow and costly manufacturing process. Furthermore, it was difficult to accurately and consistently cut the outer pipe longitudinally in half.

An extremly efficient air gap pipe and a method of manufacturing the same is disclosed in U.S. Pat. No. 4,501,302 which issued to Jon W. Harwood on Feb. 26, 1985 and which is assigned to the assignee of the subject invention. The disclosure of U.S. Pat. No. 4,501,302 is incorporated herein by reference. The method disclosed in U.S. Pat. No. 4,501,302 involves the bending of inner and outer pipes into substantially identical configurations which reflect the design specifications of the vehicle. This bending may be carried out on one of the available programmable bending machines which ensure a high degree of accuracy from one pipe to the next at extremely high speeds. The bent outer pipe then is cut longitudinally. The longitudinal cut preferably is carried out by a programmed cutting apparatus such as a plasma arc cutter or a laser cutter. As explained in U.S. Pat. No. 4,501,302 the resulting method of cutting provides very fast and accurate cuts. U.S. Pat. No. 4,501,302 indicates that supports are provided between the inner and outer pipes. Preferably, these supports are formed prior to the bending and cutting of the outer pipe. The preferred supports define inwardly directed dimples formed in the outer pipe prior to the bending and cutting operations. After the outer pipe has been appropriately bent and cut and after the supports are formed, the inner pipe is placed between the outer pipe halves and the outer pipe halves are secured to one another to provide a structurally secure air gap pipe. The outer pipe halves can be secured together substantially along their entire length or at selected spaced apart locations. The spaced apart attachments, such as weldments, can affect the rate and pattern of heat dissipation.

As noted above, the air gap pipe and method of fabrication disclosed in U.S. Pat. No. 4,501,302 is extremly desirable, efficient and effective. However, improvements to the process and to the apparatus for carrying out the process are desired to overcome certain manufacturing problems and to enable an even faster rate of production than that provided by the process disclosed in U.S. Pat. No. 4,501,302.

In view of the above, it is an object of the subject invention to provide an enhanced process for manufacturing an air gap pipe.

It is another object of the subject invention to provide a process for manufacturing an air gap pipe that substantially reduces the time required to feed pipes into the cutter.

It is an additional object of the subject invention to provide a process that enables accurate but rapid cutting of the outer pipe despite variations from one outer pipe to the next.

It is a further object of the subject invention to provide a process for facilitating the rewelding of the outer pipe halves.

Another object of the subject invention is to provide a process for manufacturing an air gap pipe that will not be significantly affected by the condensation of moisture between the inner and outer pipes during use.

An additional object of the subject invention is to provide an apparatus for accurately cutting the outer pipe longitudinally in half despite minor variations from one outer pipe to the next.

Still another object of the subject invention is to provide an apparatus for securely, accurately and rapidly positioning the outer pipe halves to one another and around the inner pipe.

SUMMARY OF THE INVENTION

The subject invention is directed to a process for efficiently manufacturing an air gap pipe for a vehicular exhaust system. The process includes the step of providing supplies of outer and inner pipes. The inner and outer pipes may be generally of the same length. However, in most circumstances the inner pipe will be longer than the outer pipe such that the inner pipe may be securely mounted to adjacent parts of the exhaust system, such as catalytic converters, mufflers, manifolds or the like.

The process of the subject invention may include the step of sequentially selecting outer pipes from the supply of outer pipes and forming supports therein. The supports may be formed by placing the outer pipe in a press apparatus, which when activated, will contact the outer pipe and form an array of inwardly directed dimples therein. This step can be performed either by manually feeding the individual pipes to the dimple forming press or by mechanically and automatically performing this feeding function. It has been found that a relatively small number of arrays of dimples are required for most air gap pipes. For example, adjacent arrays of dipples may be several feet apart. The supports need not define dimples integral with the outer pipe in all applications. For example, in some situations the supports may be resilient fingers cut into the outer pipe or separate supports mechanically attached to the inner surface of the pipe. This step may be carried out later in the process as explained further below.

The next step of the process may include bending the outer pipe or otherwise deforming the purely cylindrical outer pipe in accordance with the specifications of the vehicle for which the air gap pipe is being manufactured. This step typically will include bending an entire outer pipe relative to the initially straight center line. In other situations the pipe may merely be deformed at certain locations to clear an obstacle on a vehicle. This deformation such as the formation of flats, may not bend the original center line location. The bending step described above preferably is carried out with a programmable bending apparatus. The pipe bending step may precede or follow the step of forming supports in the outer pipe.

The inner pipes will have to be bent or otherwise formed to a shape substantially compatable with the shape of the outer pipes. The bending of a complete supply of outer pipes may be carried out either before or after the bending of a supply of inner pipes. However, it has been found that the most efficient production process occurs when the bending of the inner and outer pipes are carried out in substantially parallel operations on separate bending machines. More particularly, the bending of the outer pipes can be efficiently geared to the production rate of the cutter, as explained below. The bending of the inner pipes can also be geared to substantially match this cutting rate. Consequently the size of the inventory of pipes and the rate of production of pipes can be geared to the production rate of the cutting apparatus as explained herein. Thus, a relatively small inventory of both inner and outer pipes can be maintained thereby keeping overhead costs at a minimum.

The process next includes the step of advancing the bent outer pipes to a cutting apparatus. Preferably the cutting apparatus comprises a pair of high energy cutters, such as plasma arc cutters or laser cutters. The pair of cutters are mounted on opposite sides of the pipe to be cut and in generally juxtaposed relationship to one another. However, the cutters should be slightly offset from one another rather than aiming directly at each other.

Each high energy cutting apparatus preferably is mounted to a programmable robotic apparatus such that the cutter can move through an appropriate three dimensional pattern and follow the central line of the bent outer pipe. Preferably the programmable robotic device will include an array of pivotally connected arms the dimensions of which reflect the range of lengths of air gap pipes to be manufactured. However, the longitudinal range of the cutting apparatus can be expanded and enhanced by mounting each robotic cutting apparatus on a guide means such as one or more rails. The cutting apparatus then can be programmed to move along the guide means thereby expanding the range of movement of the cutting apparatus.

To minimize the elapsed time between successive cuts, it is preferred that a shuttle system be employed with the cutter. The shuttle can include two spaced apart work stations which move relative to the cutters. Thus, a bent outer pipe can be mounted into one end of the shuttle while a pipe that previously mounted in the other end of the shuttle is being cut. As soon as the cutting operation is complete, the shuttle rapidly moves, and the mounted but uncut outer pipe is advanced into a position to be cut. Simultaneously, the pipe that had just been cut is moved away from the cutters and into a position to be removed from the shuttle. As the cut pipe is removed a new uncut outer pipe is put in its place. This removal of the cut pipe and the mounting of the next uncut pipe is carried out while the pipe at the other end of the shuttle is being cut. Once again, upon completion of the cutting operation the shuttle moves in the opposite direction to enable a new cut to be carried out while the most recently cut pipe is replaced with a new uncut outer pipe.

It has been found that metallurgical variations from one pipe to the next cause small but significant variations in the configurations of the various pipes. More particularly, these metallurgical differences may cause pipes to respond differently to the various forces exerted thereon by the bending apparatus. The variations from one bent pipe to the next usually will be within the limits required for efficient mounting of the pipes on the vehicle. However, these variations in the bent pipes could be significant enough to cause the programmed cutting apparatus to make a substantially off-center cut along at least a portion of the pipe. An off-center cut could make it difficult or impossible to properly fit the inner pipe within the outer pipe. Consequently the process may include the step of following the actual configuration of the bent pipe with the cutter to ensure that the cut is carried out along a central axis of the pipe. This procedure is in contrast to following the preferred and intended configuration of the pipe. The apparatus for carrying out this procedure may include an array of biasing means which follow the outer surface of the bent pipe and ensure that the cutting means is centrally aligned to the longitudinal axis of the bent pipe.

It has also been found that the bending of the pipe creates various internal stresses and strains in the metallic material from which the pipe is made. When this stressed pipe is then severed longitudinally, the respective halves may bend slightly relative to one another in response to the internal stresses and strains. The precise configuration of these bends of the longitudinal halves of the cut pipe may vary somewhat from one pipe to the next in accordance with specific metallurgical differences between pipes. Consequently, it has been found to be advantageous to have each pipe half rewelded to the corresponding half from which it was originally cut. To facilitate this matching of pipe halves, it has been found advantageous to keep the pipe halves connected at their extreme ends. For example, a bent outer pipe may be cut longitudinally along its entire length except for approximately the last one quarter inch or less. Thus, the respective pipe halves will remain in contact with one another up to the reweld station. At the reweld station the small connecting length can easily be severed enabling the inner pipe to be placed between the outer pipe halves and then enabling the respective outer pipe halves to be reattached to their original counterparts.

Although the matching of original outer pipe halves in the completed air gap pipe assembly facilitates the manufacturing process somewhat, in many situations the corresponding outer pipe halves will respond differently to the stresses created therein such that the mere placing of these outer pipe halves together will not achieve the proper alignment. As a result, the longitudinal edges of the severed pipe halves may not abut one another along the entire length of the bent and cut outer pipe. Thus, the reattachmemt of the outer pipe halves could be difficult and the desired air gap may not be obtained along the entire length of the pipe.

The above described realignment problems may be overcome by placing a plurality of crimps in the longitudinal edges of the severed outer pipe halves. The crimps are angularly aligned to the longitudinal axis of the outer pipe halves and consequently at the location of each crimp the outer pipe half will have a greater effective width. The size of the crimps are selected to ensure that each crimp will contact and support a longitudinal edge of the opposing pipe half. This crimping procedure can be carried out with readily available tools and ensures that the pipe halves can be properly reattached to one another.

A more effective and preferred process avoids the additional step of crimping the outer pipe halves. This preferred process employs clamps to properly position a first outer pipe half. An insulation may then be disposed around at least portions of the inner pipe to appropriately control the flow of heat from the exhaust gas that will be directed through the air gap pipe. The inner pipe then can be placed within this properly positioned outer pipe half. The second outer pipe then is urged by the clamps into proper alignment relative to the first outer pipe half and the inner pipe. Preferably, a plurality of such outer pipe clamps are used with the activation of the respective clamps being coordinated. More particularly, the various clamps can be actuated in a rapid sequence along the length of the pipe from one end thereof to the other. This sequential operation ensures that the outer pipe half will not bulge between adjacent clamps. Each clamp may include a generally semicircular bottom member dimensioned to loosely accept one half of a pipe. Cam means or lever means may be incorporated into each clamp and may be activatable to urge the outer pipe into a predetermined location relative to the clamp.

After the respective outer pipe halves have been securely and accurately positioned around the inner pipe by the clamp means, the outer pipe halves can be reattached to one another. This reattachment can be with any suitable mechanical means, but preferably is by welding along at least a portion of the outer pipe halves. The welding can be carried out manually while the air gap pipe is securely retained in the array of clamps. Preferably, a preprogrammed welding apparatus is employed to follow the seams of the respective pipe halves and to provide appropriate weldments at selected locations or along the entire length of the pipe.

DETAILED DESCRIPTION OF THE PREFERRED EMBODIMENTS

Figure 1:
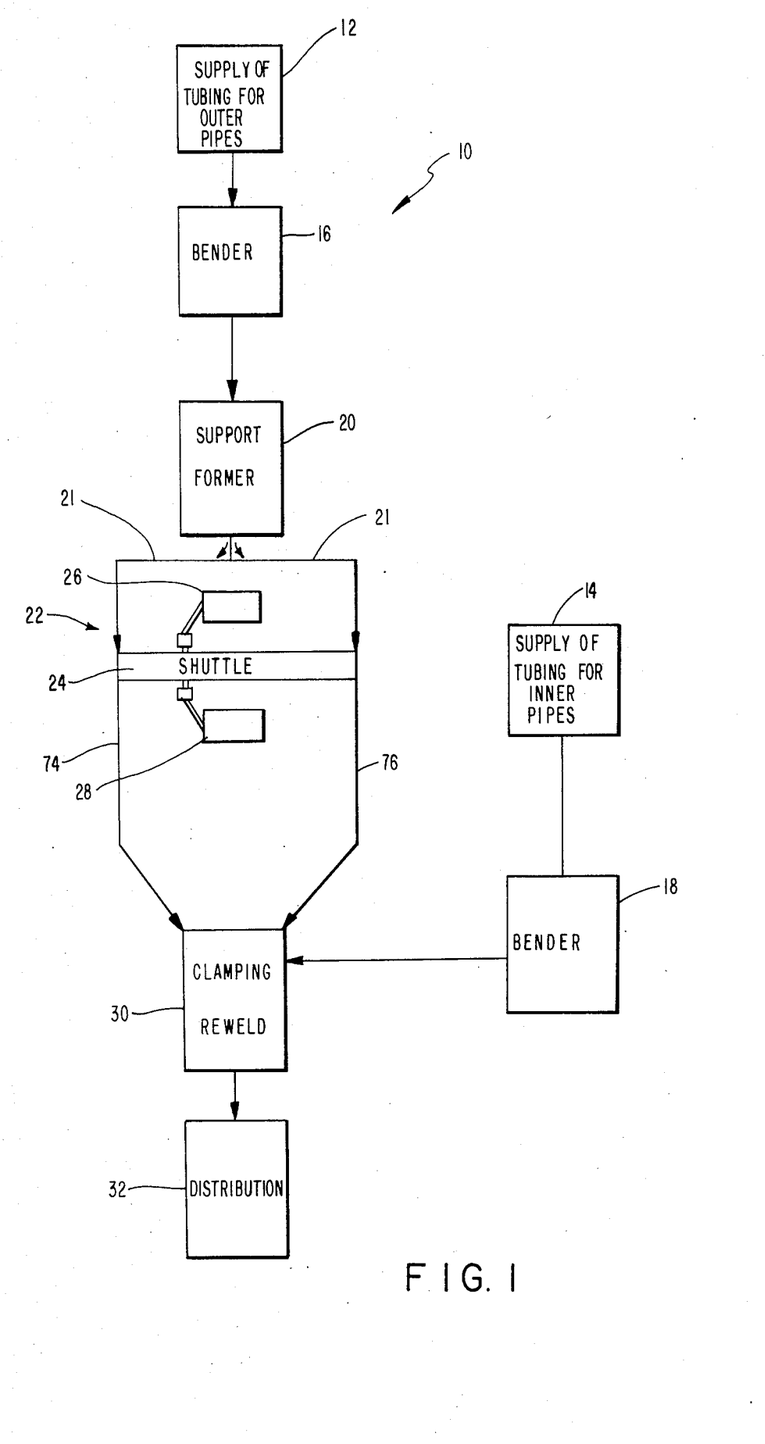
FIG. 1 is a schematic illustration of the process of the subject invention.

The process of the subject invention, as illustrated schematically in FIG. 1, utilizes an assembly of apparatuses, which is indicated generally by the numeral 10 in FIG. 1. The operation of the various machines which comprise the assembly 10 are coordinated with one another to yield a unique and extremely efficient process to manufacture air gap pipes. Each air gap pipe manufactured by the assembly 10 includes a bent inner pipe and a bent outer pipe surrounding and spaced from the inner pipe.

The assembly 10 includes a supply 12 of tubing for outer pipes and a supply 14 of tubing for inner pipes. The outer and inner pipe tubing in supplies 12 and 14 initially will be substantially linear in configuration.

The respective outer and inner pipes in supplies 12 and 14 are advanced sequentially to benders identified in FIG. 1 by the numerals 16 and 18 respectively. The benders 16 and 18 are operative to carry out the appropriate bending of the outer and inner pipes in accordance with the design specifications for the completed air gap pipe. Manual benders are acceptable for these purposes. However, it is preferred that at least one pair of automatic bending devices be used to form the appropriate bends in the outer and inner pipes. The typical automatic bending apparatus includes means for grasping the pipe at one end to enable carefully controlled axial and radial movement of the pipe. The pipe then is axially advanced and radially twisted in controlled amounts as it is fed into the bending portion of the apparatus. This bending portion bends the pipe a preprogrammed amount, while the location and direction of each bend is determined by the grasping means.

In certain situations the bender 16 will be replaced by or supplemented with means for forming flats or other such deformations to render the outer pipe non-concentric at selected locations along the length.

As noted above, the inner and outer pipes will be maintained in spaced relationship on the finished air gap pipe. Therefore it is necessary to provide appropriate supports to maintain this spaced relationship. Supporting means could comprise separate supporting members that are attachable to either the inner surface of the outer pipe or the outer surface of the inner pipe. For example, supporting legs could be attached by welding. Alternatively, supporting collars could be frictionally maintained at spaced apart locations on the inner pipe. However, in the preferred embodiment as illustrated in FIG. 1, the process includes a step of forming inwardly directed supports in the outer pipe. These supports could be inwardly directed protrusions or dimples, or arrays of spring fingers formed by cutting the outer pipe and urging portions thereof inwardly. Preferably the outer pipe is advanced incrementally through a press which is operative to urge spaced apart portions of the outer pipe inwardly a sufficient distance to support an inner pipe therein. This formation of inwardly directed supports or dimples in the outer pipe can be accomplished by either automatically or manually feeding the pipe into a press. With either the automatic or manually advancing of the pipe, the press apparatus can include a plurality of stops to define the preferred locations for the supports. The process step and apparatus for forming these supports in the outer pipe is identified by the numeral 20 in FIG. 1.

After the outer pipe is bent by bender 16, and the supports are formed therein by apparatus 20, the bent outer pipes are advanced by conveyors 21 to a programmable cutting apparatus 22. The programmable cutting apparatus preferably includes a shuttle 24 upon which the bent pipes can be sequentially mounted, and a pair of cutters 26 and 28 for cutting through the opposed longitudinal edges of each bent pipe. Preferably, the cuters 26 and 28 utilize a high energy apparatus such as a plasma arc cutter or a laser cutter. However, a suitably programmed mechanical cutter such as a nibbler or a reciprocating saw may be employed.

The mechanics of the shuttle 24 and the cutters 26 and 28 are described in greater detail below. However, continuing with the general explanation of the overall process illustrated in FIG. 1, the cut outer pipes are advanced by conveyors 74 and 76 to a clamping and reweld station 30 where the bent and cut outer pipe halves are securely positioned around the bent inner pipe and are welded in that position. The air gap pipes thus formed are sent to a distribution station 32 for inspection and appropriate packaging for shipment.

Figure 2:
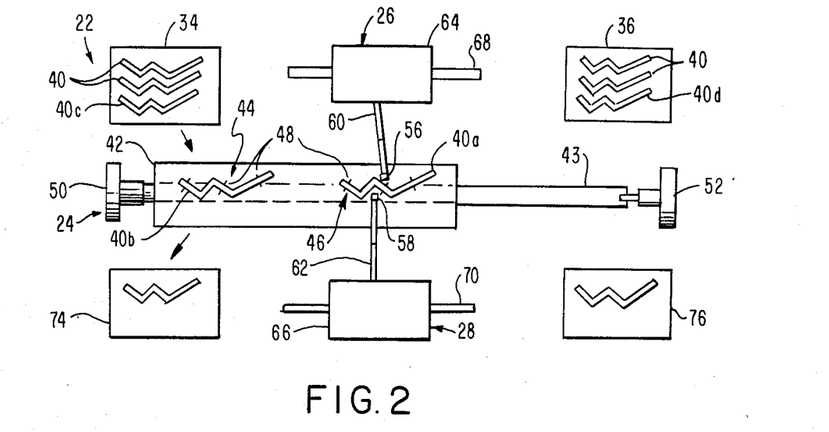
FIG. 2 is a schematic view of the cutter and shuttle assembly of the subject invention in a first operating condition.
Figure 3:
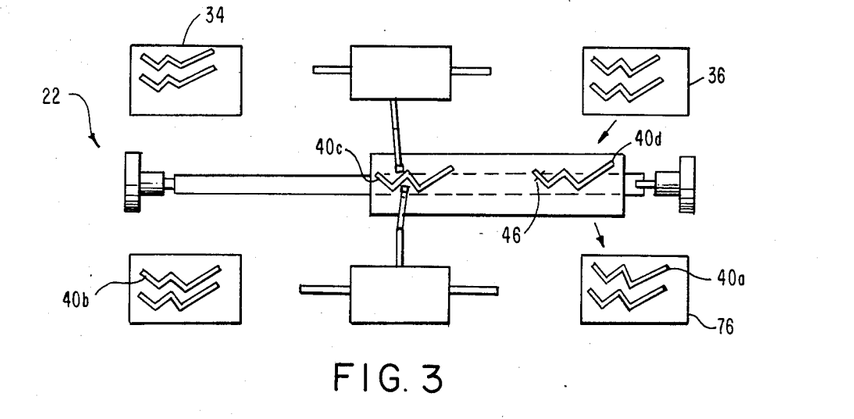
FIG. 3 is a schematic view of the cutter and shuttle assembly of the subject invention shown in a second operating condition.

The cutting station 22 of the assembly 10 is illustrated in greater detail in FIGS. 2 and 3. More particularly, the cutting station 22 includes first and second marshaling stations 34 and 36 to which bent outer pipes 40 are sent by a conveyor 21 after having been appropriately formed at bender 18, as explained above. The marshaling stations 34 and 36 are in close proximity to the shuttle 24 and are disposed on opposite ends of the cutter 26.

The shuttle 24 is disposed intermediate the cutters 26 and 28 and extends substantially between and adjacent to the marshaling areas 34 and 36. The shuttle 24 includes a carriage 42 mounted to a rail 43. The carriage 42 includes a driving means, such as a linear induction motor, for driving the carriage 42 along rail 43. The carriage 42 further includes a pair of support assemblies 44 and 46 each of which is adapted to support one bent outer pipe 40. More particularly, each support assembly 44 and 46 comprises a plurality of support brackets 48 which effectively craddle one of the bent pipes at appropriate locations thereon.

The driving means, such as the linear induction motor, is adapted to drive the carriage 42 rapidly along the rail 43 toward or away from one of the shock absorbers 50 and 52. The shock absorbers 50 and 52 are securely and rigidly mounted to a base, such as the floor of the facility in which the assembly 10 is employed. The shock absorbers 50 and 52 further include switch means which effectively terminate the power provided by the driving means of carriage 42, and which enable a reversed movement of the carriage 42 along rail 43 upon the next activation thereof.

The cutters 26 and 28 include cutting heads 56 and 58 respectively which comprise the high energy cutter or other such cutting means. The cutter heads 56 and 58 are mounted respectively to articulated arms 60 and 62 respectively which in turn are mounted to robotic devices 64 and 66 respectively. The robotic devices 64 and 66 are in communication with one another such that the respective actions of each are carefully coordinated. Furthermore, the cutting actions controlled by the robotic devices 64 and 66 are further coordinated with the movement of the shuttle assembly 24.

The robotic devices 64 and 66 can be mounted on rails 68 and 70 respectively which enable each robotic device 64, 66 to move parallel to the rail 43 of shuttle assembly 24. This movement of the robotic devices 64, 66 along rails 68, 70 substantially increases the range of the cutters 26, 28, thereby enabling very long outer pipes 40 to be cut.

The cutting station 22 further includes cut pipe conveyors 74 and 76 on which outer pipes 40 are placed immediately after being removed from the shuttle assembly. As noted above, the conveyors 74 and 76 advance the cut outer pipes 40 to the clamping and reweld station 30, the operation of which is explained in greater detail below.

In operation, the bent outer pipes 40 are carried to marshaling stations 34 or 36 by conveyors 21 such that each marshaling station 34, 36 has a supply of bent outer pipes 40. The bent outer pipes 40 then are sequentially advanced from marshaling station 34 or 36 to the appropriate support assembly 44 or 46, respectively, on the carriage 42.

More particularly, as shown in FIG. 2, when the carriage 42 is in its leftmost position on rail 43, the bent outer pipe 40a mounted on support assembly 46 is being cut by the respective cutters 26 and 28. During this cutting operation, the previously cut pipe 40b, which had been mounted on support assembly 44 is removed therefrom and placed on the cut pipe conveyor 74. Once this previously cut outer pipe 40 is removed from the support assembly 44 to the conveyor 74, the next uncut pipe 40c is moved from marshaling station 34 to the support assembly 44. This unloading and subsequent loading of bent outer pipes 40b and 40c from or into the support assembly 44 is carried out while cutters 26 and 28 are cutting the bent outer pipe 40a mounted on the support assembly 46.

After the outer pipe 40a has been cut, the arms 60 and 62 of the cutters 26 and 28 respectively are returned to their initial position and the carriage 42 is rapidly advanced along rail 43 toward the shock absorber 52. The dimensions of the carriage 42 and rail 43 are such that when the carriage 42 terminates against shock absorber 52 the support assembly 44 is substantially in the exact position that support assembly 46 had been prior to the movement of carriage 42. This new position is illustrated in FIG. 3.

Once the carriage 42 reaches this right most position, the cutters 26 and 28 commence the cutting of the bent outer pipe 40c. While this cutting is progressing, the previously cut outer 40a is removed from support assembly 46 and is placed on the cut pipe conveyor 76. The bent but uncut outer pipe 40d then is advanced from the marshaling area 36 to the support assembly 46.

It can be appreciated that this cutting of the outer pipes 40 can be carried out in rapid sequence with little or no time lost loading pipes to be cut and unloading pipes previously cut. It also should be noted that the loading and unloading of pipes 40 on the shuttle 24 can be carried out either manually or by automated equipment. The precise spacial layout of the marshaling areas 34, and the cut pipe storage areas 74, 76 will depend upon either the precise configuration of the automated equipment used to complete the loading or unloading or the number of personnel available for the manual performance of this task.

Figure 4:
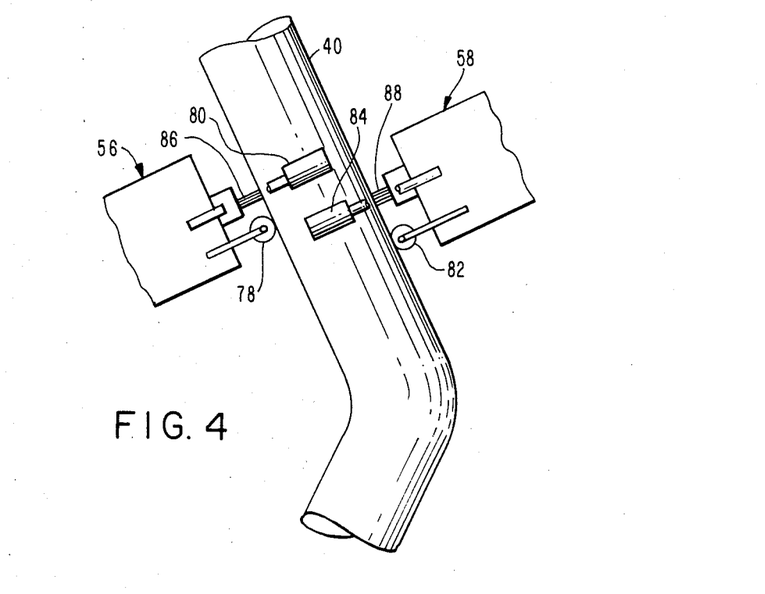
FIG. 4 is a plan view of the cutter and follower of the subject invention.

As noted above, the metallurgical characteristics of each outer pipe 40 are such that each pipe 40 may bend slightly differently in response to the forces exerted by the bender 18. Thus, a cutter 26, 28 that is programmed to be directed to a precise location conceivably could cut the outer pipe 40 in an off-center location. The two cuts thus formed in the wall of the outer pipe 40 would be spaced from one another by a distance less than the diameter of the outer pipe 40. Even a moderate off-center cut could make it difficult or impossible to properly seat the inner pipe within the outer pipe 40. To prevent this problem, the process of cutting the outer pipe 40 includes the step of following the precise contour of the bent outer pipe. An apparatus for carrying out this process step is illustrated schematically in FIGS. 4 and 5. More particularly, the cutting head 56 includes a pair of rollers 78 and 80 which are adapted to roll along and thus follow two spaced apart locations on the outer pipe 40. Similarly, the cutting head 58 includes rollers 82 and 84. The rollers 78-84 preferably either lead or are in line with the respective high energy cutters 86 and 88.

Figure 5:
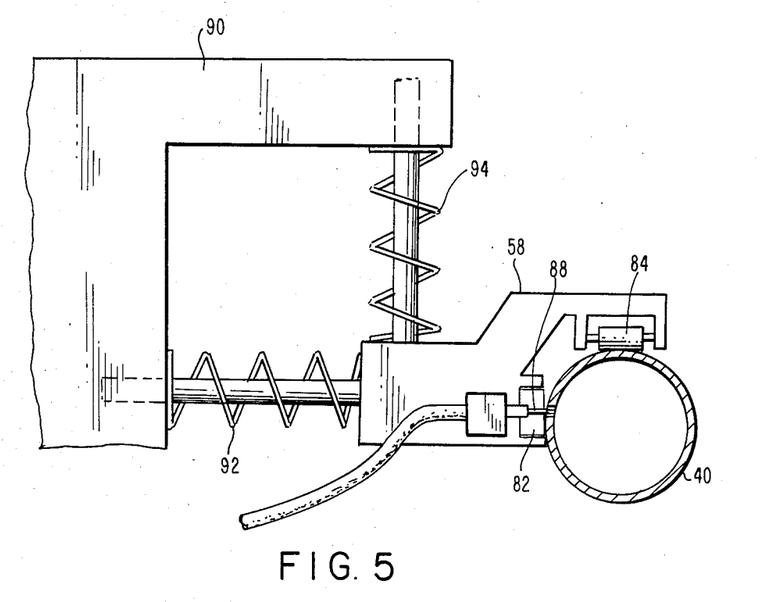
FIG. 5 is a side elevational view of the cutter and follower of the subject invention.

As shown most clearly in FIG. 5, the cutting heads can be in communication with angularly disposed spring means 92 and 94 which are spaced from one another by approximately 90° and which bias the cutting head 58 toward the outer pipe 40. As the cutting head 58 moves relative to the outer pipe under the action of the articulated arms (not shown) the rollers 82 and 84 will follow the actual position of pipe 40. Thus, in situations where the outer pipe 40 is closer to support 90 then originally intended, the cutter head 58 will urge the spring means 92 and/or 94 against the natural biasing force thereof, thereby enabling the cutter head to precisely follow the actual alignment of outer pipe 40. Conversely, where the actual alignment of the pipe 40 is further from the support 90 than the intended alignment thereof, the spring means 92 and/or 94 will cause the cutter head 58 to be urged toward the actual alignment.

Figure 6:
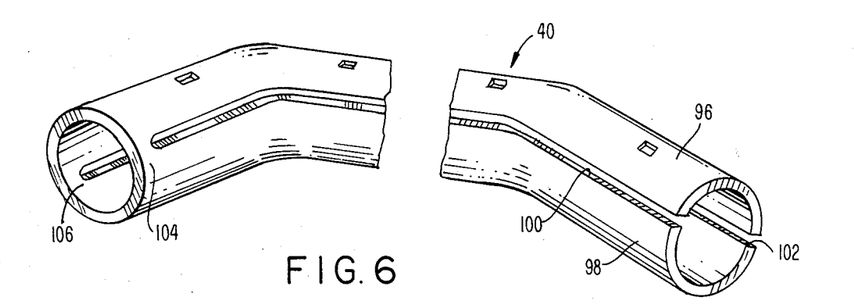
FIG. 6 is a perspective view of an outer pipe formed according to the process of the subject invention.

Turning to FIG. 6, an outer pipe 40 is shown in its cut form after having left the cutting apparatus 22 illustrated in FIG. 1. More particularly, the outer pipe 40 includes opposed halves 96 and 98 which are spaced from one another by longitudinal cuts 100 and 102. It has been found, however, that the reattachment of the outer pipe half 96 and 98 around an inner pipe can be facilitated if each outer pipe half 96, 98 is matched with the corresponding half from which it was cut. This rematching is greatly facilitated by stopping the respective longitudinal cuts 100, 102 short of the end of pipe 40. More particularly, short connecting portions 104, 106 are provided at the end of pipe 40. These connecting portions preferably extend less than one quarter inch and ensure that the matched halves remain in contact with one another up to the reweld station 30 of the assembly 10 as shown in FIG. 1. At that point in the process, the halves 96 and 98 of the outer pipe 40 can be severed by merely rotating the halves 96 and 98 away from one another sufficiently to sever the connections 104 and 106.

FIGS. 7 through 13 illustrate clamps for use at the clamp and reweld station of the assembly shown in FIG. 1. As described above, the bending of the outer pipes 40 creates various internal stresses and strains. When the bent outer pipe 40 is subsequently cut, these stresses and strains cause the respective halves of each outer pipe 40 to twist differently relative to one another. Thus, the outer pipe halves normally cannot merely be placed in juxtaposed relationship such that the opposed cut edges thereof are precisely aligned. The clamps shown in FIGS. 7 through 13 facilitate this proper alignment. More particularly, with reference to FIG. 7, the clamp is indicated generally by the numeral 110. The clamp 110 includes a bottom support 112 having a generaly semicircular recess 114 formed therein. The clamp 110 further includes a top support 116 which also includes a generally semicircular recess 118. The dimensions of the semicircular recesses 114 and 118 are selected to correspond to the diameter of the outer pipe 40. A cylinder assembly 120 is mounted adjacent the bottom support 112. The cylinder assembly 120 includes a piston member 122 which is pivotally mounted to a pair of gripping arms 124 and 126 respectively. The gripping arms 124 and 126 extend generally parallel to one another and toward the semicircular recess 114 in the bottom support 112 such that the arms 124 and 126 are substantially tangent to opposed sides of the semicircular recess 114.

Figure 7:
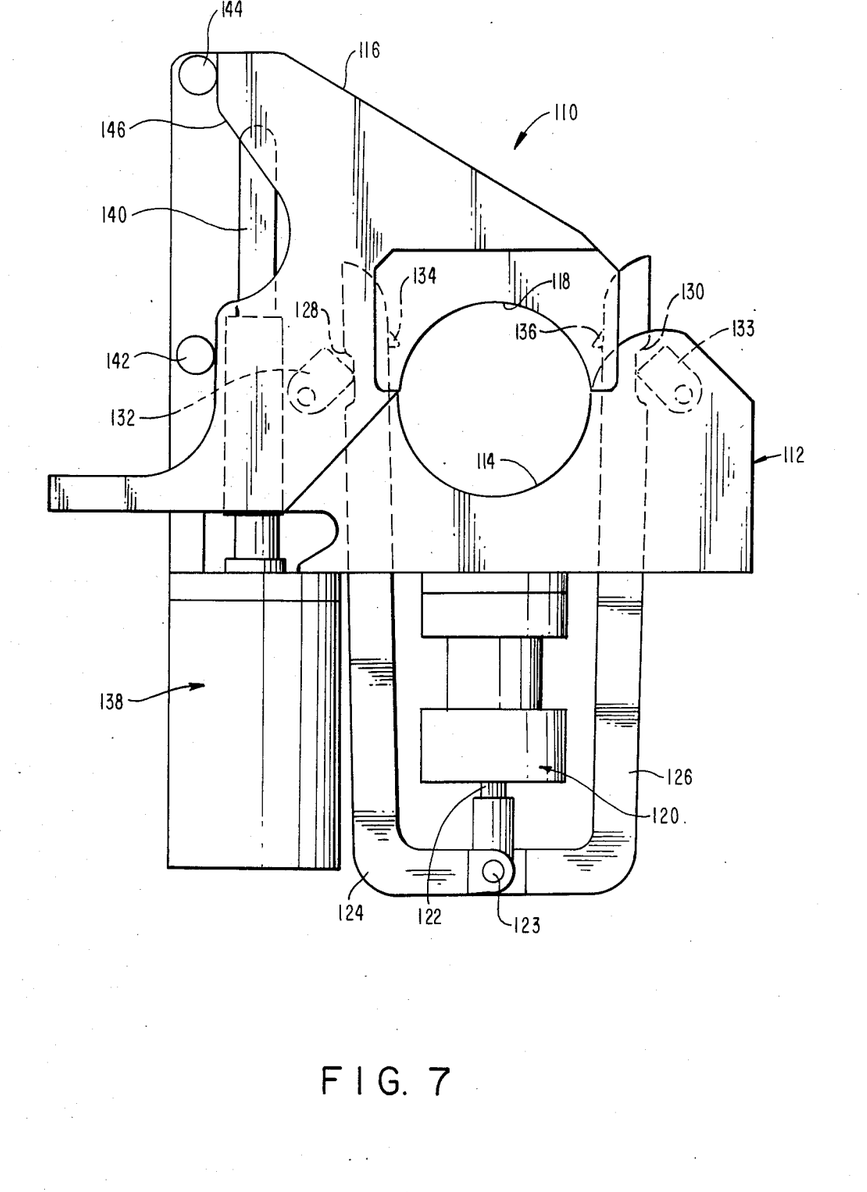
FIG. 7 is a front elevational view of a clamp according to the subject invention.

The arms 124 and 126 each include cam following surfaces 128 and 130 which define indentations in the respective arms 124 and 126. The cam following surfaces 128 and 130 are in communication with cams 132 and 133 respectively. As a result of this structure, a movement of the piston 122 relative to the cylinder assembly 120 will cause a downward movement of the gripping arms 124 and 126. As the arms 124 and 126 move the cam follower surfaces 128 and 130 thereof will interact with the cams 132 and 133 such that the arms 124 and 126 will rotate toward one another about common pivot point 123. The arms 124 and 126 are provided with gripping protrusions 134 and 136 respectively. The gripping protrusions 134 and 136 are disposed generally opposite the uppermost portions of the cam following surfaces 128 and 130 and are operative to grip and securely seat a half of outer pipe 40 in the bottom support 112 as explained below.

A second cylinder assembly 138 is mounted adjacent to the top support 116. More particularly the second cylinder assembly 138 includes a driving piston 140 which is pivotally mounted to the top support 116. The clamp 110 further includes a pair of cams 142 and 144 which are disposed adjacent a cam following surface 146 on the top support 116. The relative locations of the cams 142 and 144 and the configuration of the cam following surface 146 is such that the activation of the piston 140 causes the top support 116 to undergo a rotational movement in response to the cooperation between the cam follower surface 146 thereof and the cams 142 and 144.

Figure 8:
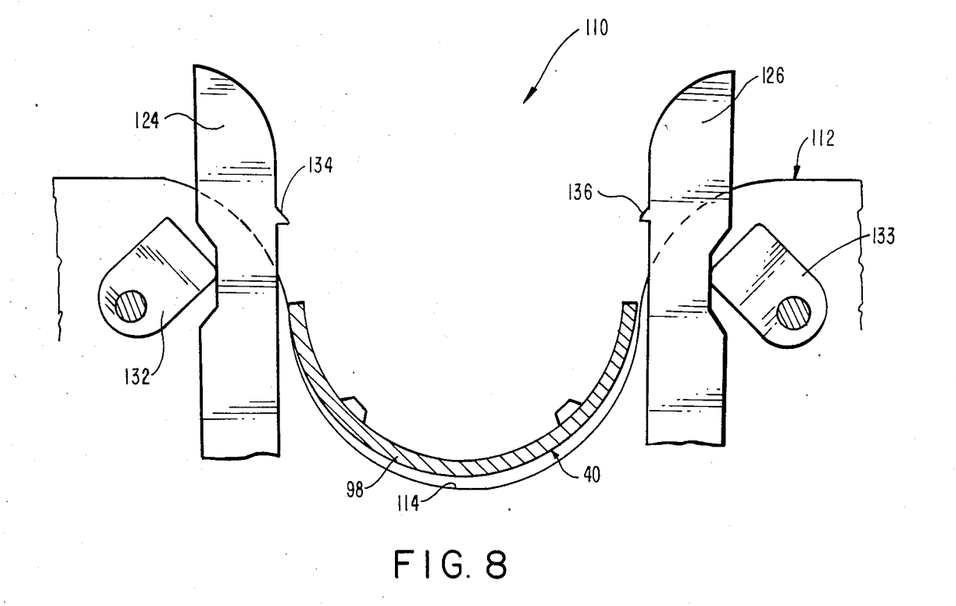
FIGS. 8-12 show sequential steps during the operation of the clamp shown in FIG. 8.

The sequential operation of the clamp 110 is illustrated in FIGS. 8 through 12. More particularly, as shown in FIG. 8, the piston 140 has been disposed relative to the cylinder assembly 138 such that the top support 116 is rotated away from the bottom support 112. Additionally, the piston 122 is positioned relative to the cylinder assembly 120 such that the gripping arms 124 and 126 are in their maximum upward position and are substantially tangent to the semicircular recess 114. In this position, the bottom half 98 of an outer pipe 40 is placed in the semicircular recess 114 of the bottom support 112. As shown in FIG. 8, the twisting of the bottom half 98 of outer pipe 40 may result in the bottom half 98 being spaced from the semicircular recess 114.

Figure 9:
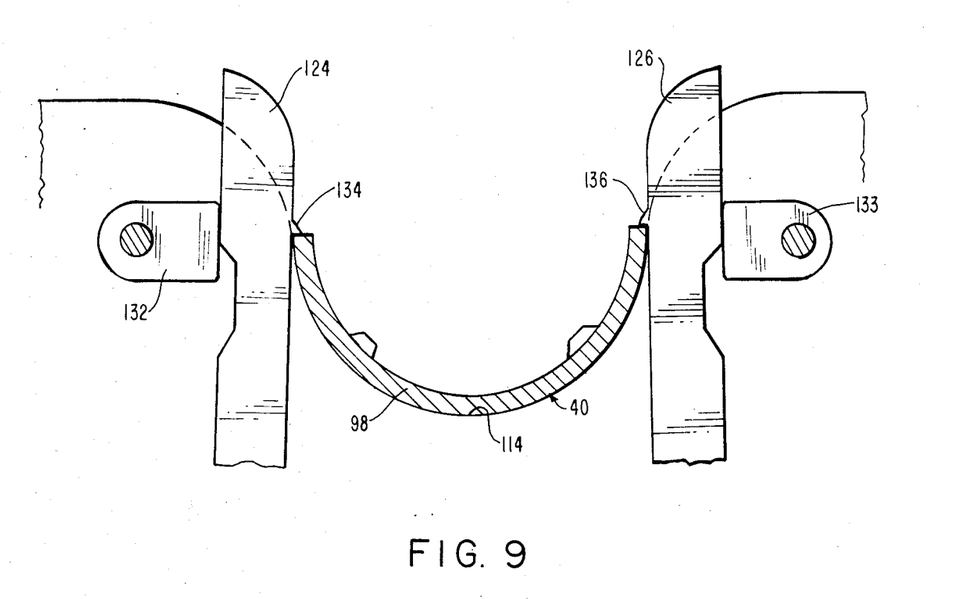

Turning to FIG. 9, the bottom half 98 of the outer pipe 40 is securely and tightly pulled into the semicircular recess 114 of the bottom support 112 by the gripping protrusions 134 and 136 of the gripping arms 124 and 126 respectively. More particularly, the piston 122 is activated to move downwardly relative to the cylinder 120, and thereby to cause a corresponding downward movement of the arms 124 and 126. This movement of the arms 124 and 126 causes the cam follower surfaces 128 and 130 therefore to interact with the cams 132 and 133. Thus, as shown in FIG. 9, the arms 124 and 126 will rotate about their common pivot point 123 and toward one another. This minor movement of the arms 124 and 126 toward one another, when combined with their downward movement, causes the gripping protrusions 134 and 136 of the arms 124 and 126 to pull the bottom half 98 of outer pipe 40 securely into the semicircular recess 114.

Figure 10:
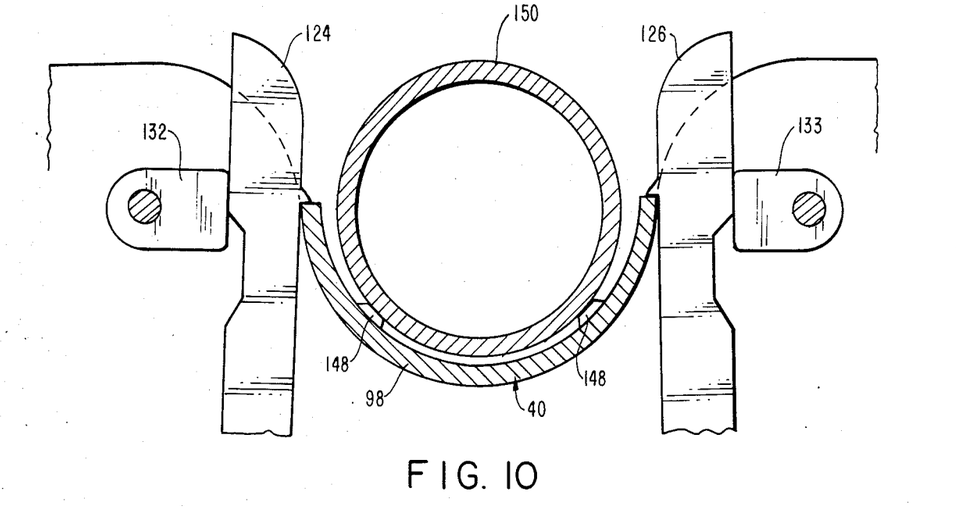

Once the bottom half 98 of outer pipe 40 is properly seated in the semicircular recess 114 of bottom support 112, the inner pipe 150 is positioned therein, as shown in FIG. 10. Specifically, the inner pipe 150 is placed on the supports 148 of the outer pipe 40. Although not shown the inner pipe 150 may first be wrapped with insulation at selected locations.

Figure 11:
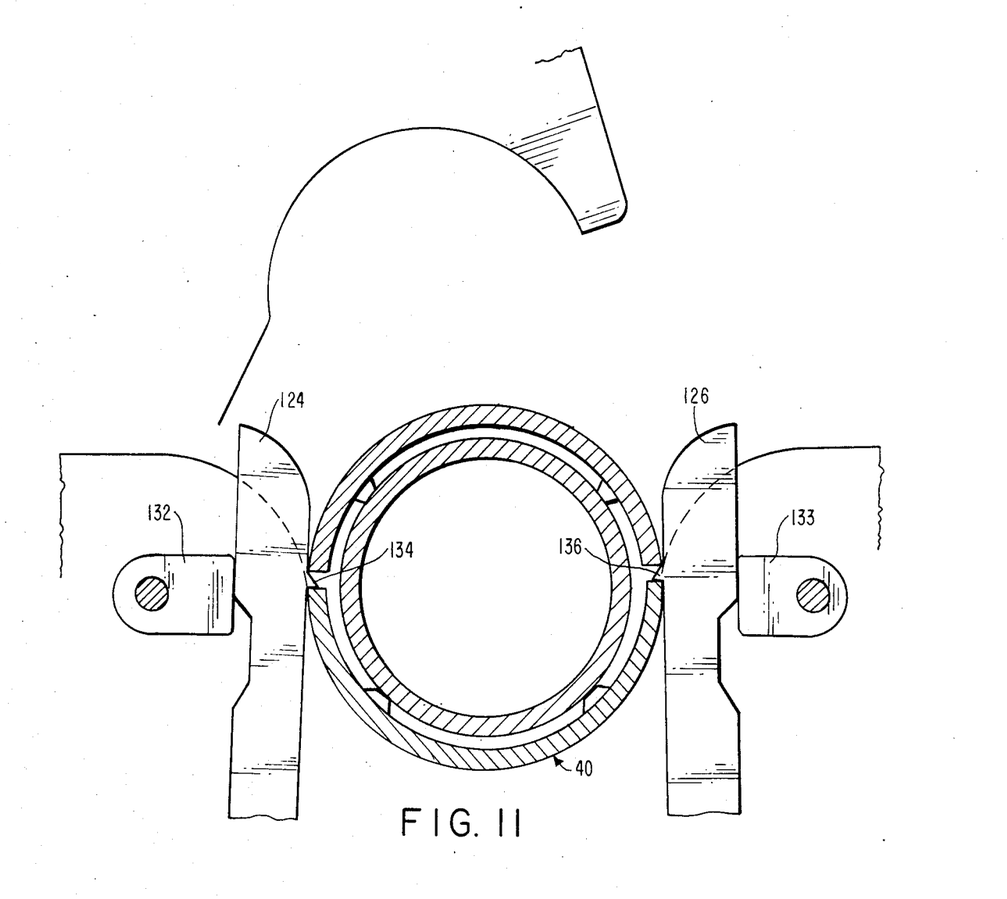
Figure 12:
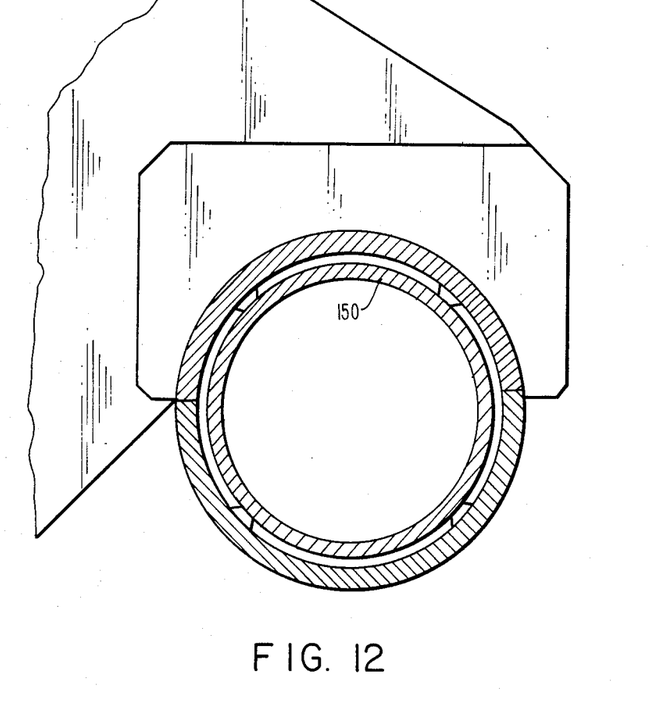

Turning to FIG. 11, the top half 96 of outer pipe 40 then is positioned on top of the inner pipe 150 and the bottom half 98 of outer pipe 40. As shown in FIG. 11, the twisting of the top half 96 will result in a loose fit of the outer pipe halves 96 and 98 relative to one another.

The top half 96 of outer pipe 40 is urged securely into position relative to the bottom half 98 thereof and the inner pipe 150 by activating the piston 140 relative to the cylinder 138. This movement of the piston 140 causes a downward generally rotational movement of the top support 116 such that the semicircular recess 118 thereof securely engages the top half 96 of outer pipe 40 and urges the top half 96 into the condition shown in FIG. 12. Once clamped into this secure position, the outer pipe 40 can be rewelded or otherwise secured to create a structurally and functionally effective air gap pipe.

Figure 13:
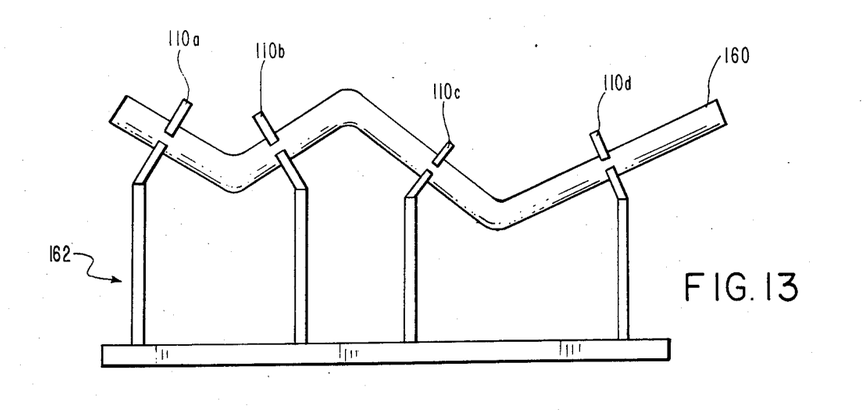
FIG. 13 is a schematic view of an assembly of clamps in accordance with the subject invention.

With reference to FIG. 13, a plurality of clamps 110a through 110d are shown in engagement with a completed air gap pipe 160. More particularly, the clamps 110a–110d are mounted to a fixture 162 the dimensions and configuration of which reflect the design specifications of the air gap pipe. The clamps 110a–110d preferably are operated by hydraulic or pneumatic means such that the individual clamps 110a–110d are actuated sequentially either from left to right or from right to left as shown in FIG. 13. The sequence can be very rapid. However, the proper sequence important to ensure that the pipe does not buckle between adjacent clamp. The sequences carried out first with respect to the respective pistons 122 to achieve a proper and secure mounting of the bottom half 98 of outer pipe 40, and then again with respect to the activation of pistons 140 to achieve a proper and secure mounting of the top half 96 of pipe 40.

Figure 14:
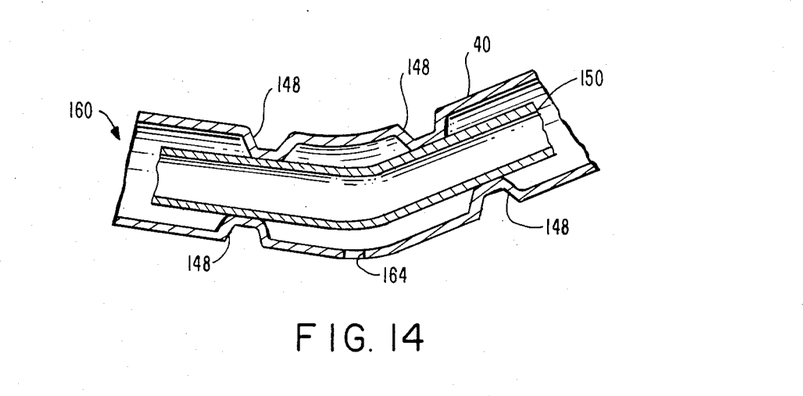
FIG. 14 is a cross sectional view of an air gap pipe formed in accordance with the process of the subject invention.

FIG. 14 shows a cross sectional view of a completed air gap pipe 160. More particularly, the air gap pipe includes an outer pipe 40 and an inner pipe 150. The distance between the inner and outer pipes 150 and 140 is maintained by supports 148. As shown in FIG. 14, an aperture 164 is formed in the outer pipe 40 at a location thereon that will define a low point on the air gap pipe 160 when installed in a vehicle. This aperture enables an efficient draining of condensation that may form between the inner and outer pipes 150 and 40. Such a draining of fluid will contribute to the long life of the air gap pipe 160.

In summary, an improved process and apparatus for forming an air gap pipe is provided. The process includes the steps of forming supports to enable a proper mounting of the inner and outer pipes relative to one another. The inner and outer pipes then are bent into appropriate configurations and the outer pipe is cut longitudinally. Preferably, the cutting of the outer pipe is carried out by a programmed apparatus which employs a high energy cutting means such as a plasma arc device or a laser device. The cutter preferably includes a shuttle which moves relative to the cutter to enable the removal of previously cut pipes and the mounting of uncut pipes. Thus, after a cut has been completed, the shuttle is activated to advance the just-mounted pipe into a position to be cut and to simultaneously advance the just-cut pipe into a position to be removed. A follower is employed to trace the actual configuration of the pipe, and thereby to compensate for any variations from one pipe to the next. The cutting preferably stops short of the actual end of the pipe to keep the respective pipe halves partially attached up to the point where the inner pipe will be mounted into the outer pipe. An array of clamps are employed to facilitate the proper alignment of the outer pipe halves prior to reattachment thereof. A plurality of such clamps are employed and are operated sequentially along the length of the pipe.

While the invention has been described and illustrated relative to a preferred embodiment, it is obvious that various modifications can be made without departing from the sprit of the invention as defined by the appended claims.

What is claimed is:

1. A process for forming a nonlinear air gap pipe utilizing a programmable cutting apparatus, said process comprising the steps of:
   providing supplies of inner and outer pipes with the radial dimension of each inner pipe being selected to enable the mounting of each inner pipe within a corresponding outer pipe;
   bending the inner and outer pipes into similar nonlinear configurations;
   sequentially mounting each respective outer pipe to a support;
   moving the support into proximity to the cutting apparatus;
   cutting the outer pipe substantially longitudinally in half with the cutting apparatus;
   moving the longitudinally cut outer pipe away from the cutting apparatus;
   separating the longitudinal halves of the cut outer pipe;
   crimping the longitudinal edges of each longitudinal half of the outer pipe at selected locations;
   placing the inner pipe between the cut longitudinal halves of the outer pipe;
   resecuring the longitudinal outer pipe halves together around the inner pipe.

2. A process as in claim 1 wherein the support is a first support and wherein the process includes the further steps of:
   mounting alternate outer pipes to a second support while said outer pipe in the first support is being cut;
   moving the second support and the outer pipe mounted therein into proximity to the cutting apparatus after the cutting of the pipe of the first support and simultaneously moving the first support and the respective pipe away from the cutting apparatus; and
   cutting the pipe in the second support while the pipe in the first support is being removed therefrom and while the next respective pipe is being mounted to said first support.

3. A process as in claim 1 further comprising the step of applying insulation at selected locations between said inner and outer pipes prior to resecuring the outer pipe halves together.

4. A process for manufacturing an air gap pipe, said process comprising the steps of
   providing substantially linear inner and outer pipes, the inner pipe being dimensioned to fit within the outer pipe with an air gap radially therebetween;
   deforming at least said outer pipe at at least one location along its length;
   cutting through the deformed outer pipe along opposed longitudinal sides thereof from one end of the pipe to a point spaced slightly from the opposed end thereof;
   severing the outer pipe from said point to said opposed end to form two longitudinal outer pipe halves;
   placing the inner pipe between the severed outer pipe halves; and
   securing the outer pipe halves to one another.

5. A process as in claim 4 wherein the step of deforming comprises bending both said inner and outer pipes.

6. A process as in claim 4 further comprising the step of forming supports in the outer pipe to maintain the inner and outer pipes in spaced relationship to one another.

7. A process as in claim 4 wherein the outer pipe is cut by a high energy cutting apparatus.

8. A process as in claim 7 wherein the high energy cutting apparatus comprises a plasma arc cutter.

9. A process as in claim 7 wherein the high energy cutting apparatus comprises a laser cutter.

10. A process as in claim 4 wherein the pipe is cut by a mechanical cutting apparatus.

11. A process as in claim 4 further including the step of clamping the outer pipe halves to one another prior to reattaching the outer pipe halves to one another.

12. A process as in claim 11 wherein the step of clamping comprises the step of clamping the outer pipe at a plurality of locations along its length.

13. A process as in claim 12 wherein the clamping of the outer pipe is carried out sequentially at said plurality of locations beginning at one end of said outer pipe and progressing to the other end.

14. A process as in claim 11 wherein the step of clamping the outer pipe comprises a first step of clamping a first outer pipe half into a position for receiving the inner pipe and subsequently including the step of clamping the second outer pipe half into position relative to the first outer pipe half and the inner pipe.

15. A process as in claim 4 further comprising the step of forming one or more apertures through the outer pipe to facilitate drainage of liquid therefrom.

16. A process as in claim 4 wherein the step of cutting the outer pipe comprises the step of following the actual outer pipe configuration to ensure an accurate cut thereof.

17. A process for forming a nonlinear air gap pipe utilizing a programmable cutting apparatus, said process comprising the steps of:
   providing supplies of inner and outer pipes with the radial dimension of each inner pipe being selected to enable the mounting of each inner pipe within a corresponding outer pipe;

bending the inner and outer pipes into similar nonlinear configurations;

providing a plurality of pipe supports, each said pipe support being configured to receive one said bent outer pipe;

sequentially mounting the bent outer pipes to selected ones of said supports;

sequentially presenting the supports and the bent outer pipes mounted thereto to the cutting apparatus;

cutting the bent outer pipe presented to the cutting apparatus substantially longitudinally in half with the cutting apparatus, while approximately simultaneously removing a previously cut outer pipe from another of said supports and mounting a bent uncut outer pipe thereto;

separating the longitudinal halves of each said cut outer pipe;

placing one of said bent inner pipes between the cut longitudinal halves of one said outer pipe;

resecuring the longitudinal outer pipe halves together around the inner pipe.

18. A process as in claim 17 further comprising the step of crimping the longitudinal edges of each longitudinal half of the outer pipe at selected locations prior to resecuring the outer pipe halves together.

19. A process as in claim 17 further comprising the step of applying insulation at selected locations between said inner and outer pipes prior to resecuring the pipe halves together.

20. A process as in claim 17 wherein said plurality of pipe supports comprises two pipe supports securely mounted to a shuttle, said shuttle being movable between first and second positions for sequentially presenting said supports to said cutting apparatus.

21. A process as in claim 17 wherein the step of cutting the bent outer pipe comprises the further step of adjustably moving the cutting apparatus to accommodate variations between the respective bent outer pipes.

* * * * *